US005774592A

United States Patent [19]
Takeuchi et al.

[11] Patent Number: 5,774,592
[45] Date of Patent: Jun. 30, 1998

[54] PARALLEL IMAGE PROCESSING WITH COMPENSATION FOR MOTION OF IMAGE

[75] Inventors: Yoshitaka Takeuchi; Masato Kato, both of Tokyo, Japan

[73] Assignee: Canon Kabushiki Kaisha, Tokyo, Japan

[21] Appl. No.: 506,258

[22] Filed: Jul. 24, 1995

Related U.S. Application Data

[63] Continuation of Ser. No. 76,831, Jun. 15, 1993, abandoned.

[30] Foreign Application Priority Data

Jun. 29, 1992 [JP] Japan .................................. 4-194964
Dec. 28, 1992 [JP] Japan .................................. 4-360132

[51] Int. Cl.[6] .................................................. G06K 9/40
[52] U.S. Cl. .......................... 382/236; 382/234; 382/107
[58] Field of Search ................................... 382/232, 233, 382/234, 236, 248, 250; 348/384, 394, 395, 420, 403

[56] References Cited

U.S. PATENT DOCUMENTS 5,028,995 7/1991 Izawa et al. ............................ 358/105
5,113,255 5/1992 Nagata et al. .......................... 358/105
5,138,447 8/1992 Shen et al. ............................. 358/105
5,144,426 9/1992 Tanaka et al. ......................... 358/105
5,148,269 9/1992 de Haan et al. ....................... 358/105
5,235,419 8/1993 Krause ................................... 358/105

*Primary Examiner*—Michael T. Razavi
*Assistant Examiner*—Gerard Del Rosso
*Attorney, Agent, or Firm*—Fitzpatrick, Cella, Harper & Scinto

[57] ABSTRACT

An image processing device which comprises an input terminal 1, 100 for inputting an image signal, a dividing circuit 29, 101 for dividing the image signal into a plurality of code groups, and a plurality of processing circuits 31a, 31b, 31c, 31d, 105, 106, 107 for processing the plurality of code groups respectively. Each of said plurality of processing circuits includes a motion detection circuit 21, 206, 207 for detecting a motion of the image, and a handling circuit, 111, 112, 113, 114 for handling a part of the code group to another processing circuit.

14 Claims, 17 Drawing Sheets

PARALLEL IMAGE PROCESSING WITH COMPENSATION FOR MOTION OF IMAGE

This application is a continuation of application Ser. No. 08/076,831, filed Jun. 15, 1993, now abandoned.

BACKGROUND OF THE INVENTION

Field of the Invention

This invention relates to a device for processing an image signal, especially a processing device which is suitable for handling a motion image signal, for handling a high speed signal, or for detecting motion in the image represented by the image signal and compensating for the influence of unwanted motion.

DESCRIPTION OF THE RELATED ART

Recently, methods for encoding a digital image signal to decrease a data amount thereof have been known and used for transmitting the motional image signal. For example, a predictive encoding system and an encoding system using a DCT (Discrete Cosine Transform) are known.

In these encoding systems, motion detection between adjacent fields or frames and motion compensation by using motion detection have already been put into effect. The motion compensation is carried out by searching similar image elements in an adjacent field or frame to image elements in a field or frame to be encoded to improve the compressional efficiency of digital image data.

At first, an instance of motion detection is briefly described by using FIG. 1 as follows. In FIG. 1, label 401 shows a present frame as a subject frame to be encoded. In the present frame, image data of the entire frame is divided into blocks, each of which has (M×N) pixels, N being an integer equal to two or more. Label 403 shows one of plural divided blocks in the present frame. A searching area 405 of a suitable extent is prepared in a preceding frame 402 to the present frame and is positioned around a block 404 which is put on the same position in the frame as the block 403 to be encoded. A block 406 having the same extent as the block 404 is put in various positions in the searching area 405, denoted by a and b. Then, in each of the various positions, the sum of absolute values of differences between all corresponding pixels in block 403 and block 406 is calculated by using the following numeral formula (1).

$$S(a,b) = \sum_{i=1}^{i=N \times N} |Pi(x,y) - i(x-a, y-b)| \quad (1)$$

In the numeral formula (1), Pi (x,y) is data of the i-th pixel in the present block 403, and i (x-a, y-b) is data of the i-th pixel in the block 406 which is positioned at a certain position within the searching area 405 in the preceding frame 402.

Next, (herein called "a proper position of block" 406) (a "proper block" 406) is decided in the searching area 405 such that the proper block has the least sum value S (a,b). Then a motion vector for the present block 403 is determined.

These processes are carried out for each block in the entire present frame 401.

In the above-mentioned instance, the sum of the absolute values of the differences between each two blocks is calculated. However, the motion vector can be provided by other methods to detect motion of the image in order to improve efficiency of encoding. For example, the method can include a step for calculating a square of the differences or a step for computing non-linear characteristics.

In general, images in adjacent frames are similar to each other except for unwanted movements added to the original signal. Therefore, some encoding systems use a calculation step for calculating differences between values to be encoded and predictive values thereof. The predictive values are provided from a pixel or pixels having a correlation with a pixel to be encoded. The already-mentioned motion vector is used for seeking the pixel which has the strongest correlation with the pixel to be encoded.

In this way, it becomes possible to decrease the data volume of the image signal more efficiently.

However, there are some problems when applying the above-mentioned prior encoding system to a high-speed signal which needs high-speed processing, such as a high definition television (HDTV) signal provided by a HDTV system. This is because higher-speed processing requires more expensive devices and more complex hardware. For instance, for sampling the HDTV signal at high sampling frequency, e.g. 74.25 MHz or 37.125 MHz, and encoding the sample signal, hardware circuits have to be composed of high-speed processing devices, e.g. ECL (emitter-coupled logic). Use of high speed processing devices results in higher costs and larger hardware sizes when many of such devices are used.

SUMMARY OF THE INVENTION

An object of the invention is to provide a device for processing an image signal which can solve the above-mentioned problems.

One concrete object of this invention is to provide an image signal processing device which can process a high-speed image signal without higher-speed processings even if the device has motion detecting means.

According to one aspect of the invention there is provided an image processing device which comprises input means for inputting an image signal, dividing means for dividing the image signal into a plurality of code groups, and a plurality of processing means for processing the plurality of code groups, wherein each of such plurality of processing means includes a motion detection circuit for detecting motion of the image.

Another concrete object of this invention is to provide an image processing device which can process a high-speed image signal without higher-speed processings and can prevent production of inferior images, by means of dividing the image signal into a plurality of code groups.

According to another aspect of the invention there is provided an image processing device which comprises input means for inputting an image signal, dividing means for dividing the image signal into a plurality of code groups, each of which corresponds to pixels in one of plural unseparated areas into which one picture is divided, and a plurality of processing means for processing the plurality of code groups wherein each of said plurality of processing means includes transferring means for transferring a part of the code group to another of the processing means.

Other inventive aspects and features of the invention will be apparent from the following detailed description and accompanying drawings, as will advantages of these aspects of the invention.

DETAILED DESCRIPTION OF PREFERRED EMBODIMENTS

Some embodiments of this invention are described by referring to the appropriate figures as follows.

Figure 1:
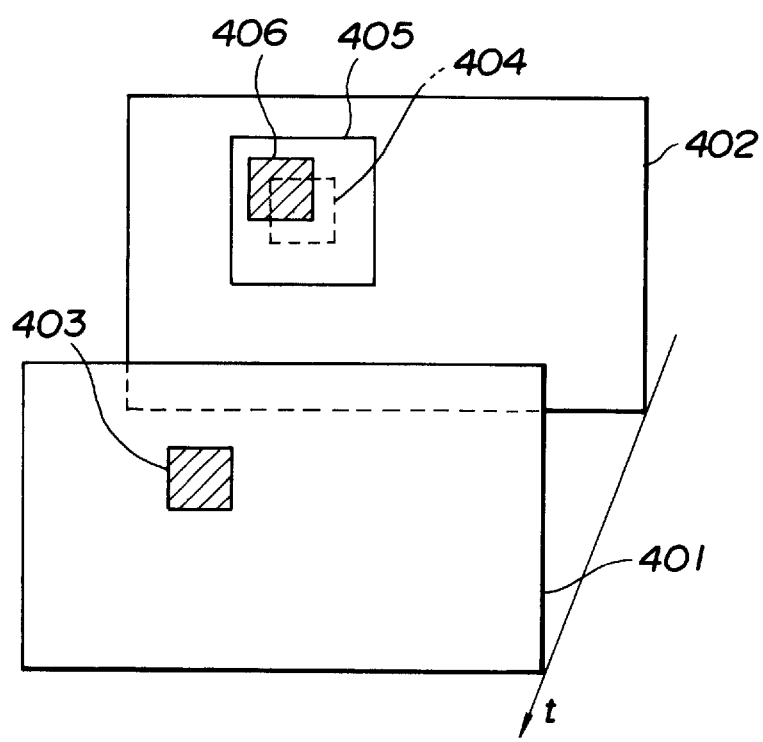
FIG. 1 shows a divided block of a present frame and a seeking area of a preceding frame to describe motion detection.
Figure 2:
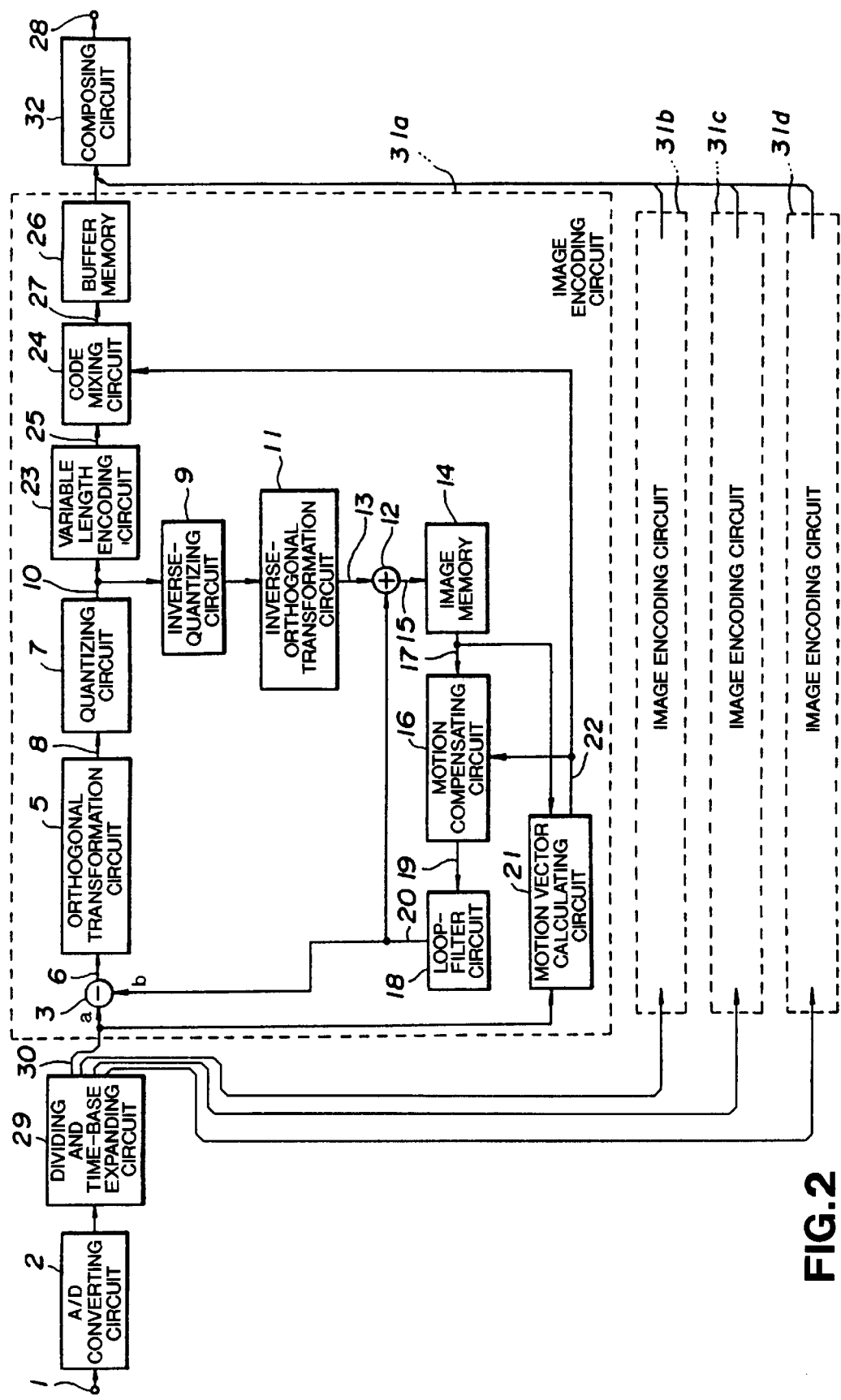
FIG. 2 shows a principal portion of an encoding device as a first embodiment of this invention.

FIG. 2 shows a principal portion of an encoding device as a first embodiment of this invention.

In FIG. 2, label 1 shows an input terminal for inputting an analogue image signal, 2 shows an A/D (analogue-to-digital) converting circuit for converting the input analogue signal to a digital image signal, 3 shows a predictive error calculation circuit for calculating differences between an image signal 30 of a present frame and a predictive image signal 20 described afterward to provide a predictive error signal 6. Label 5 shows an orthogonal transformation circuit for transforming the predictive error signal based on an orthogonal transformation, and 7 shows a quantizing circuit for quantizing orthogonally transformed coefficients 8 outputted from the orthogonal transformation.

Label 9 shows an inverse quantizing circuit for inverse-quantizing quantized orthogonal-transformed coefficients (predictive error signal) 10, label 11 shows an inverse orthogonal transformation circuit for inverse orthogonal-transformed coefficients, 12 shows a reproduction image calculating circuit for calculating a reproduced image signal 15 of the present frame by adding a predictive error signal 13 inverse-orthogonally transformed and the predictive image signal 20. Label 14 shows an image memory for storing the reproduced image signal of the present frame. Label 16 shows a motion compensating circuit for compensating a reproduced image signal of the preceding frame 17 for motion between the present frame and the preceding frame. Label 18 shows a loop-filter circuit for filtering the motion-compensated image signal 19 to pass low frequency components in a two-dimensional frequency area for providing the predictive image signal 20.

Label 21 shows a motion vector calculating circuit for calculating a motion vector 22 by comparing the image signal of the present frame 30 with the reproduced image signal of the preceding frame for every block to be recorded. Label 23 shows a variable length encoding circuit for encoding the predictive error signal 10 to transform it into codes having a variable-length. Label 24 shows a code mixing circuit for mixing predictive error codes 25 and codes indicating motion vectors 22 to form transmissive-framed encoding codes 27. Label 26 shows a buffer memory for temporarily storing the transmissive-framed encoded codes 27 prior to transmitting them at a predetermined transmitting speed. Label 28 shows an output terminal for outputting transmissive codes to a transmissive path.

Label 29 shows a dividing and time-base expanding circuit which has a circuit for dividing the digital image signal codes provided by A/D converting circuit 2 into K (>2) processing code groups, a circuit for further dividing each of the processing groups into a plurality of encoding code blocks, and a circuit for time-base expanding a signal composed of each of the processing code groups to lower the processing speed of each of the processing code groups. The dividing and time-base expanding circuit outputs the image signal of the present frame 30 in parallel. One of the image signals of the present frame 30 is supplied to the predictive error calculation circuit 3.

Labels 31a, 31b, 31c and 31d show identical image encoding circuits composed of circuits 3~26. Each of circuits 31a, 31b, 31c and 31d handles one of the K divided processing code groups. In this embodiment, it is assumed that K is four and there are four image encoding circuits.

Label 32 shows a composing circuit for composing one encoded code sequence from four channels of the encoded codes processed through circuits 31a, 31b, 31c and 31d at every processing code group.

Operation of the above-mentioned first embodiment is described as follows.

First, the analogue image signal input from the input terminal is converted to a digital image signal by the A/D converting circuit 2. In the case that the analogue image signal is a HDTV signal, a select sample frequency for a luminance signal is 74.25 MHz and a select sampling frequency for a color-difference signal is 37.125 MHz.

The dividing and time-base expanding circuit 29 writes the digital image signal in a memory which is equipped for dividing the digital image signal into K (=four) processing code groups in circuit 29.

Figure 3:
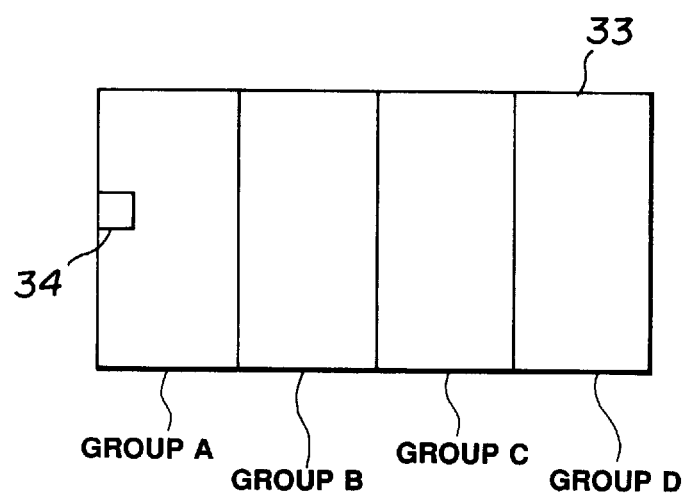
FIG. 3 shows a model of one frame of the digital image signal to explain a concrete example of dividing the digital image signal into four processing code groups.

FIG. 3 shows a model of one frame of the digital image signal (codes) to explain a concrete example of dividing the digital image signal into four processing code groups. In FIG. 3, label 33 shows that one frame of digital codes arranged as actual pixels is arranged on an image. As shown in FIG. 3, one frame of digital codes is divided into four processing code groups, namely, group A, group B, group C, and group D. Each processing code group is composed of codes corresponding to pixels which are in an unseparated area in a frame. In short, there are four divided areas in each frame.

In the case that one memory unit is able to store codes of one processing code group, a writing operation for each frame of the digital image signal is carried out by respectively using four memory units. A reading operation is carried out such that four divided code groups, as shown in FIG. 3, are read from the four memory units in parallel.

In the reading operation, each of the processing code groups are read from one of the four memory units with a time-base expansion which is carried out such that a period of time for reading one processing code group does not exceed a period of time for one frame of the image signal. Due to the time-base expansion, subsequent processing can be slow.

In the reading operation, each of the processing code groups are further divided into a plurality of encoding blocks 34, and divided encoding blocks are then read out one after another from each of the four memory units. Each encoding blocks is composed of (M×N) pixels having M continuous pixels in a horizontal direction of the frame and N continuous pixels in a vertical direction of the frame.

Output codes from the dividing and time-base expanding circuiting 29 are distributed among the four image encoding circuits 31a, 31b, 31c and 31d. The four processing code groups are supplied to inputs (a) of four predictive error calculation circuits labeled 3 and four motion vector calculating circuits labeled as 21 respectively. The four image encoding circuits 31a, 31b, 31c and 31d have quite similar circuits, and therefore only the image encoding circuits 31a are described as follows.

An input (b) of the predictive error calculation circuit 3 receives the predictive image signal (codes) 20. The circuit labeled 3 calculates differences between the image signal (codes) of the present frame 30 and the predictive image signal (codes) 20, and outputs results of the calculation as the predictive error signal 6.

The orthogonal transformation circuit 5 orthogonally transforms the predictive error signal (codes) 6 and outputs predictive-error orthogonally transformed coefficients 8. As the system of the orthogonal transformation, DCT is used because it is both well known and easily realized.

The quantizing circuit labeled as 7 quantizes the orthogonally transformed coefficients 8, calculates predictive-error orthogonally transformed and quantized coefficients, and then outputs them as predictive error signal 10.

On the other hand, the inverse-quantizing circuit 9 inverse-quantizes the predictive error signal (codes) 10. The inverse-orthogonally transforming circuit 11 inverse-orthogonally transforms inverse-quantized coefficients and calculates the predictive error signal 13 including some inverse-quantized error. The reproduction image calculating circuit 12 adds the predictive error signal 13 including some inverse-quantizing errors and the predictive signal 20 outputted from the loop-filter circuit 18, and calculates the reproduced image signal (codes) 15 of the present frame for each of the encoding blocks.

The image memory labeled as 14 stores the reproduced image codes 15 of the present frame and outputs the reproduced image codes (signal) of the preceding frame 17 stored therein. The motion vector calculating circuit 21 compares the image codes of the present frame 30 and the reproduced image codes of the preceding frame 17 stored in the image memory 14, and outputs motion vectors for each of the encoding blocks. A further process concerning encoding blocks near boundaries among the four divided areas shown in FIG. 3 is described afterward.

The motion compensating circuit 16 compensates the reproduced image signal of the preceding frame 17 for motion according to the motion vectors, and outputs the motion-compensated image signal. More specifically, motion compensating circuit 16 outputs codes of similar (M×N) pixels to (M×N) pixels of the encoding block to be encoded at timings when the (M×N) pixels to be encoded are input to the predictive-error calculation circuit. The motion compensating circuit labeled as 16 delays the pixels for various times and changes the order of the pixels.

The loop-filter circuit labeled 18 filters the motion-compensated image code of each of the encoding blocks to pass only low frequency components in the two-dimensional frequency area, and outputs filtered codes as the predictive signal (codes) 20. The predictive codes 20 are supplied to the predictive-error calculation circuit 3 and the reproduction image calculating circuit 12. The loop-filter circuit 18 executes the above-mentioned filtering process by only using codes included in the same processing group as codes to be filtered.

The variable length encoding circuit 23 changes the order of the orthogonally transformed coefficients (the predictive error signal) 10 quantized by the quantizing circuits 7, and also encodes the quantized, re-ordered coefficients to output the predictive error codes (encoded codes) 25.

The code mixing circuit 24 encodes the motion vectors, mixes the encoded motion vectors with the predictive error codes 25, and outputs the transmissive formed encoded codes 27 which is formed according to a predetermined data arrangement.

The buffer memory 26 temporarily stores the transmissive formed encoded codes 27, and supplies them to the composing circuit 32. The composing circuit 32 forms one encoded code sequence having the original high data rate. The encoded code sequence is outputted from the output terminal 28 to the transmission path.

Figure 4A:
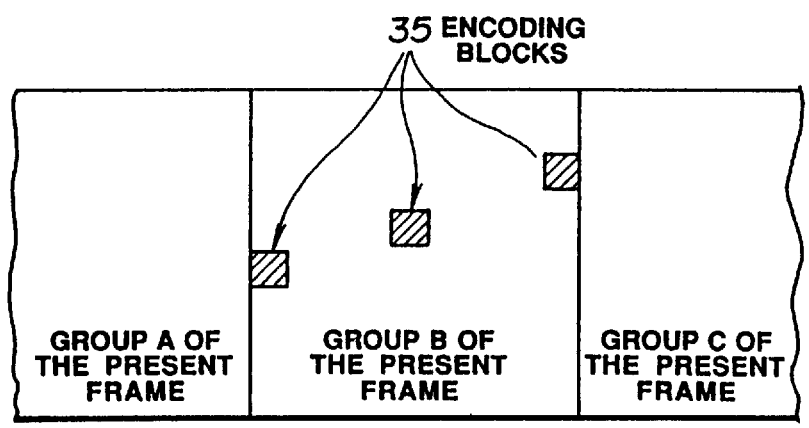
FIG. 4(a) shows a model of a part of the codes in the present frame.
Figure 4B:
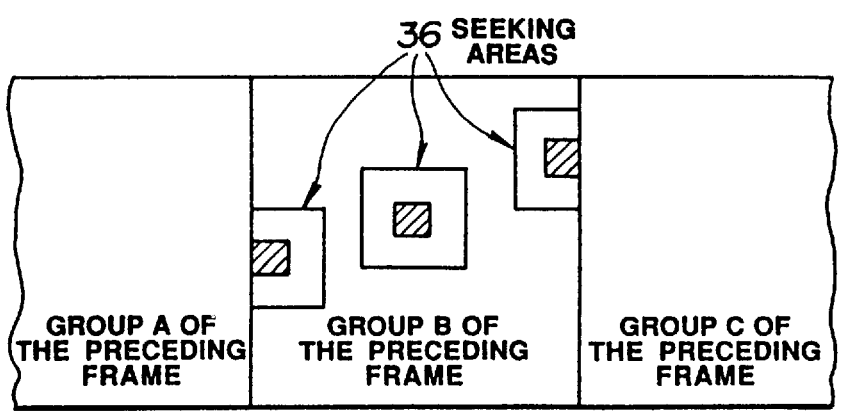
FIG. 4(b) shows a model of a part of the codes in the preceding frame.

Next, a process of seeking a motion vector in the motion vector calculating circuit 21 is described with reference to FIG. 4(a) and FIG. 4(b). FIG. 4(a) shows a model of a part of codes in the present frame, particularly codes in the processing code group B. FIG. 4(b) shows a model of a part of codes in the preceding frame, particularly codes in the processing code group B.

In FIGS. 4(a) and 4(b), cross-hatched portions 35 show the encoding blocks, one of which is located near a boundary between the processing code groups A and B, another of which is in the middle of the area corresponding to the processing code group B, and the remaining one of which is near a boundary between the processing code groups B and C. In FIG. 4(b), portions 36 show seeking areas which are prepared corresponding to the blocks to be encoded. In short, a block of (M×N) pixels having the highest correlation with block 35 to be encoded is sought in a respective seeking area 36.

The four processing code groups are individually processed in the four image encoding circuits 31a~31d. Therefore, each of the image encoding circuit is not able to use codes in other processing code groups. Accordingly, as shown in FIG. 4(b), seeking areas corresponding to encoding blocks positioned near the boundaries are more limited than are other seeking areas. These limiting processes are executed by software processes carried out by the motion vector calculating circuit 21.

These processes are described in detail as follows. First, the processes discriminate a position of a present encoding block and determine the seeking area thereof. Secondly, they compare codes of (M×N) pixels corresponding to the present encoding block with codes of (M×N) pixels in the seeking area. Such comparisons are executed for all (M×N) pixels in the seeking area of the preceding frame. Additionally, they select the most similar (M×N) pixels by calculating a sum of absolute values of difference between all corresponding pixels, as mentioned above. Then, the software process determines a motion vector for the present encoding block according to the relative position between the present encoding block and the most similar (M×N) pixels.

If the most similar (M×N) pixels are in other processing code groups, (i.e. if they are not in the seeking area), then the motion vector is not determined according to them. For example, in the case that the encoding block in the processing code group B is close to the boundary between the processing code groups A and B, the motion vector cannot be decided according to (M×N) pixels including codes in the processing code group A, even if the (M×N) pixels are most similar to pixels of the encoding block. Therefore a motion vector indicating a motion from a left side to a right side cannot be selected. Thus the motion vector is also limited.

In addition, seeking areas for encoding blocks positioned near edges of a frame are limited, and motion vectors for them are also limited.

As described above, an encoding device as a first embodiment of this invention can slow the speed of processing for motion compensation. In other words it can handle a higher speed signal than prior devices. The present device has many beneficial aspects, including easy control, reduction in the amount of hardware, and a reduction in the price thereof because the device divides the image signal into K processing groups and individually processes these groups.

The above-mentioned first embodiment divides the image signal into a plurality of processing code groups by dividing an area of each frame in a horizontal direction. Further an encoding device, which divides the image signal by dividing an area of each frame in a vertical direction, can bring good results just like the above-mentioned first embodiment.

While the first embodiment divides the image signal into four processing groups, an encoding device dividing the image signal into two or more processing groups can give good results like the first embodiment.

A device detecting motion between adjacent fields or a device detecting motion between an adaptable field or frame can bring good results, as does the first embodiment. In this invention, one field or one frame is sometimes called one picture.

Only an encoding device is described in the first embodiment; a decoding device corresponding to the above-mentioned encoding device can process the image signal passed through the transmission path by dividing the image signal into a plurality of processing code groups, as mentioned in the following description of the embodiments.

As described above, the first embodiment of this invention greatly improves the slowing of the processing speed. On the other hand, motion vectors corresponding to the encoding blocks positioned near boundaries between areas corresponding to processing code groups are limited. These limitations may cause inferior images around the boundaries.

Figure 5:
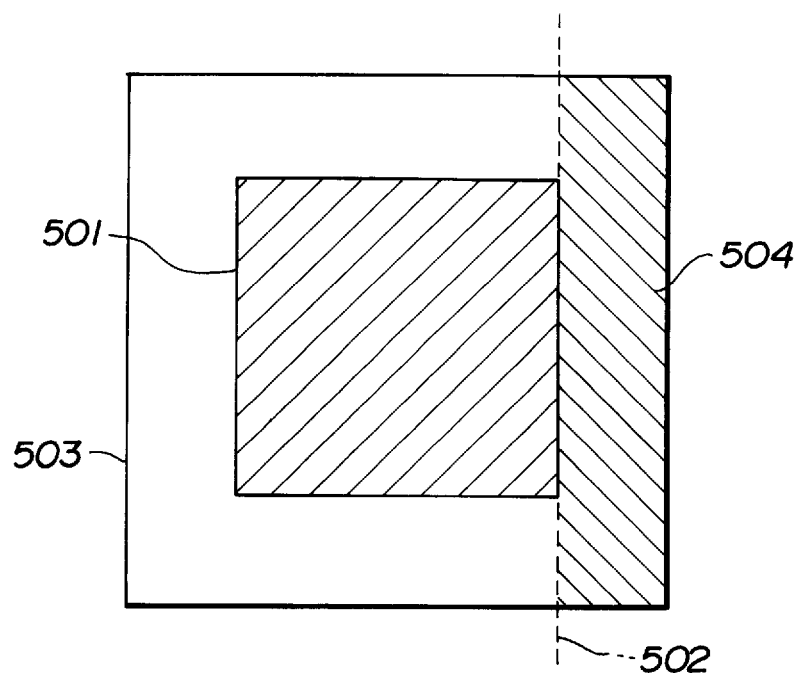
FIG. 5 shows a seeking area and corresponding block positioned at the same position as the encoding block of the present frame.

FIG. 5 shows the seeking area 503 and a corresponding block positioned at the same position as the encoding block of the present frame. Label 502 shows a boundary between processing code groups. As described above, when the encoding block is close to the boundary 502, the seeking area 503 is limited. Label 504 shows an invalid area for using the seeking area, and this invalid area is attached in FIG. 5. In other words, this invalid area 504 sometimes causes inferior images in the encoding block close to the boundary 502.

The following second, third, and fourth embodiments can solve such a problem of inferior images close to the boundaries.

Figure 6:
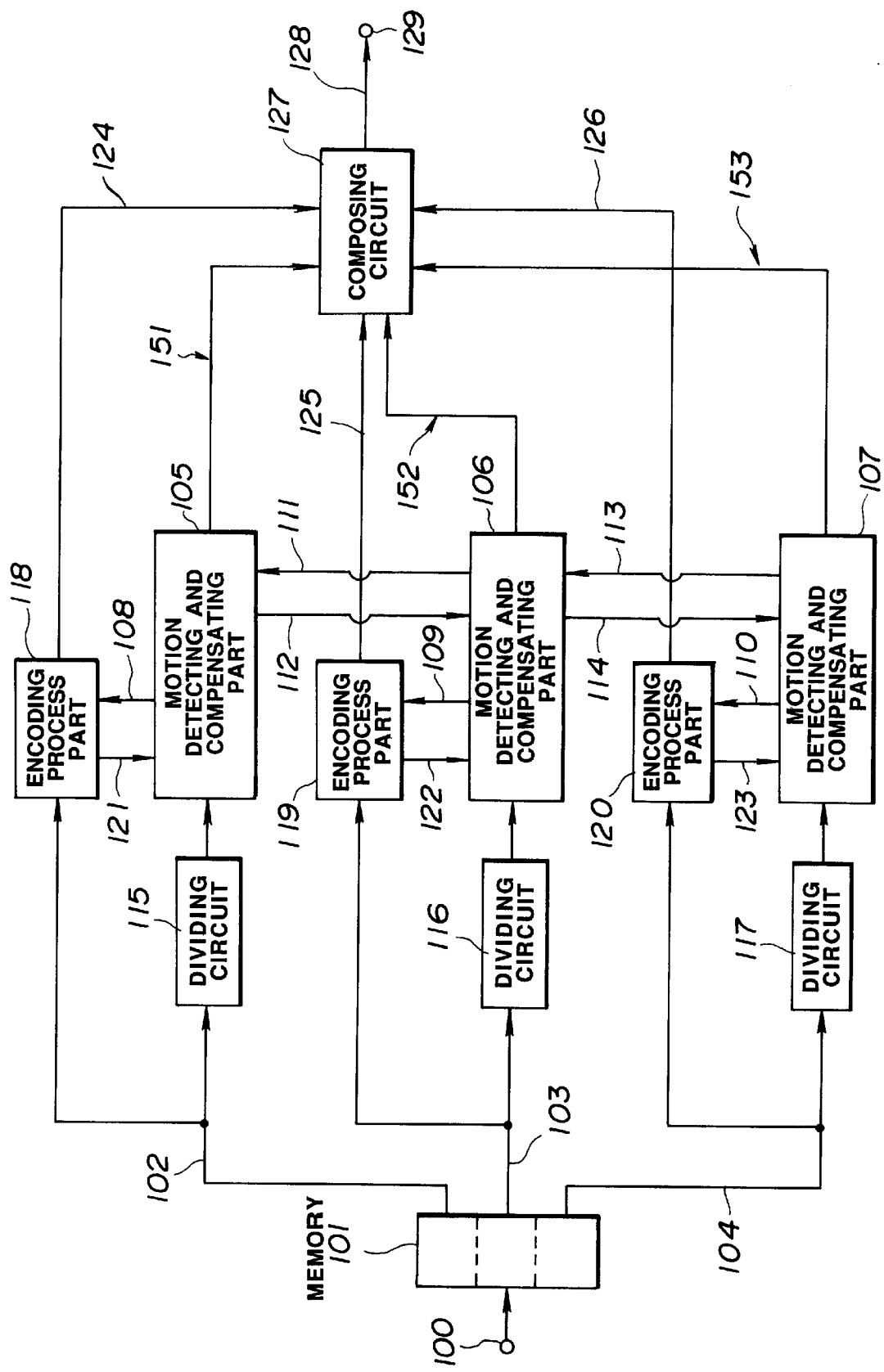
FIG. 6 schematically shows an encoding device as a second embodiment of this invention.

FIG. 6 schematically shows an encoding device as a second embodiment of this invention. This device divides the image codes into three processing code groups. Each of the processing code groups corresponds to a continuously divided area in a frame, the same as the first embodiment.

Image data inputted from input terminal 100 are supplied to memory 101. The memory divides the image data into three processing code groups, and codes of each processing code group are time-base expanded. The codes of the three processing code groups are supplied to dividing circuits 115, 116 and 117 by passing lines 102, 103 and 104, respectively.

The dividing circuits 115, 116, and 117 divide the codes into a plurality of code blocks, respectively. Each of the code blocks is composed of codes corresponding to (A×B) pixels, A and B being 2 or more.

In this embodiment, each group of image codes which is not divided into code blocks is supplied to encoding process parts 118, 119 and 120. Therefore, these encoding process part 118, 119 and 120 do not have to execute encodings by the code blocks as a unit.

Each of the code blocks divided by dividing circuits 115, 116 and 117 is supplied to motion detecting and compensating parts 105, 106 and 107. Parts 105, 106 and 107 detect motion vectors and output vector codes according to motion vectors to lines 151, 152 and 153. The outputted vector codes from the encoding process parts 118, 119 and 120 via lines 121, 122 and 123 compensate for the motion in accordance with the motion vectors detected therein. The compensated image codes are returned to the encoding process parts 118, 119 and 120 via lines 108, 109 and 110. Encoded image codes and the vector codes are supplied to the composing circuit 127 via lines 124, 125 and 126 for forming one encoded code sequence that is outputted from an output terminal 129 via a line 128.

Lines 111, 112, 113 and 114 are provided for handing or transferring some codes from one of the motion detecting and compensating parts 105, 106 and 107 to another. Accordingly, each of the parts 105, 106 and 107 can reference a part of the image codes of other processing code groups. In other words, each of the parts 105, 106 and 107 can reference some image codes in other continuously divided area. These transfers are one of the characteristics of this embodiment, and are described in detail as follows.

Figure 7:
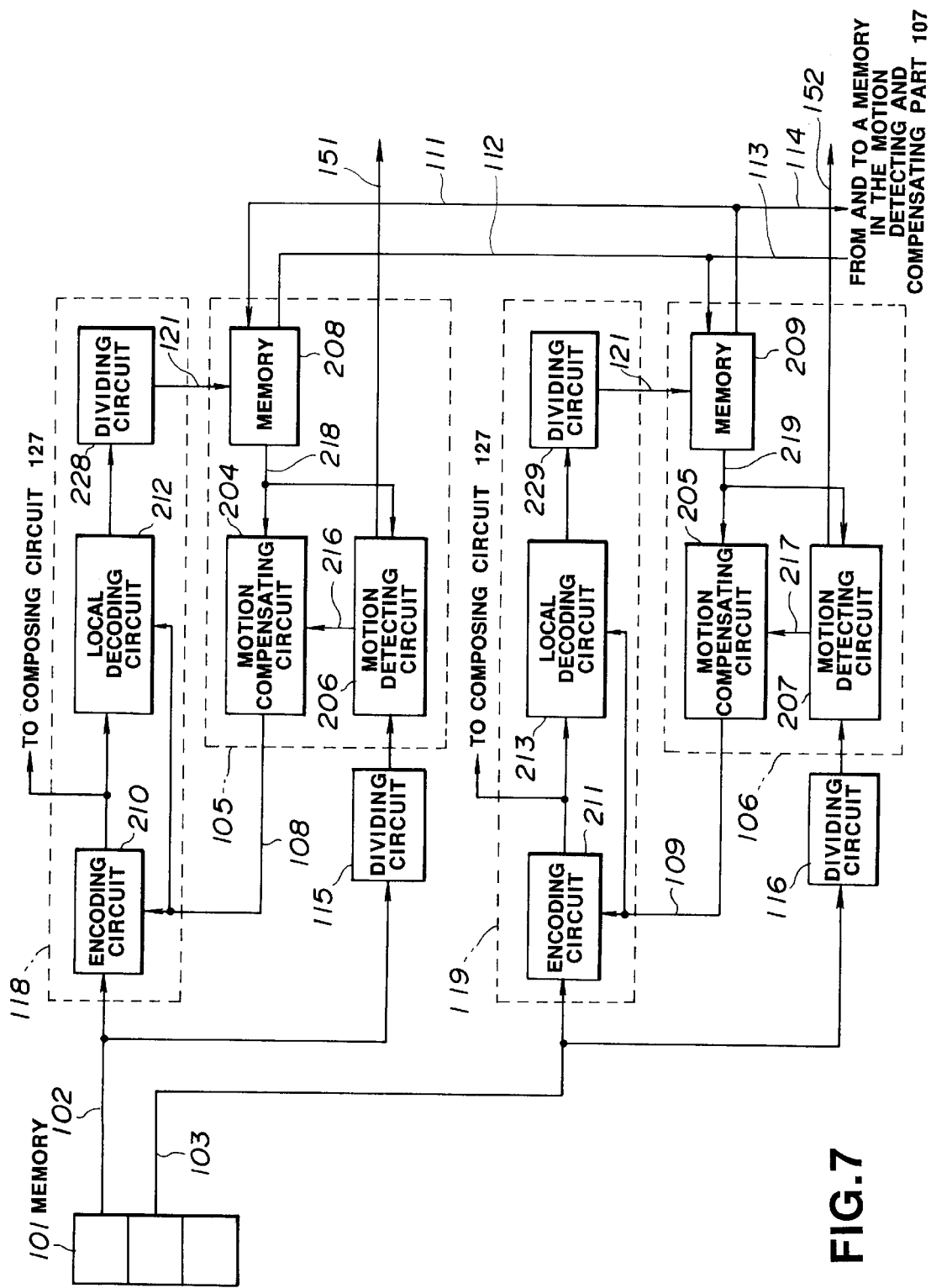
FIG. 7 shows principal parts of the encoding device shown in FIG. 6.

FIG. 7 shows the principal parts of the encoding device shown in FIG. 6. In FIG. 7, the same numbers are used for the same elements in FIG. 6.

Image codes of the first image processing group are supplied to an encoding circuit 210 in the encoding process part 118 via the line 102. The encoding circuit 210 encodes image codes for compressing an amount of their data by using the image codes of the preceding frame. For instance, encoding circuit 210 executes a well known predictive differential coding routine which calculates a predictive value by using the image codes of the preceding frame on line 108 provided by the motion detecting and compensating part 105.

The encoded codes outputted from the encoding circuit 210 are supplied to the composing circuit 127 as above described, and are also supplied to a local decoding circuit 212. The local decoding circuit 212 decodes the encoded codes by processing them in opposite processes which use the image codes of the preceding frame on line 108. Next, decoded image codes from the local decoding circuit are supplied to a dividing circuit 228 which processes the codes the same way as dividing circuit 115. Memory 208 is arranged to be able to store the decoded image codes by an amount of which is more than one third of an amount of codes of one frame.

The motion detecting circuit 206 receives the image codes of the present frame from the dividing circuit 115 and the image codes of the preceding frame from memory 208 via a line 218. The motion detecting circuit 206 detects the motion vectors for each of the code blocks by the same process as the motion vector calculating circuit 21 shown in FIG. 2 and outputs the motion vector formed thereby to the line 151. The detected motion vectors are subsequently supplied to a motion compensating circuit 204 via line 216 for compensating the decoded image codes of the preceding frame for motion. The motion compensating circuit 204 works the same as motion compensating circuit 176 shown in FIG. 2.

In addition, circuits 205, 207 and 209 in the motion detecting and compensating part 106 work the same as circuits 204, 206 and 208 in the motion detecting and compensating circuit 105. Circuits 211, 213 and 229 in the encoding process part 119 work the same as circuits 210, 212 and 228 in the encoding process part 118.

Lines 111 and 112 are provided for handing the image codes between memories 208 and 209. Lines 113 and 114 are provided for handing the image codes between memory 209 and a memory located in the motion detecting and compensating part 107.

In the situation that the encoding block to be encoded is close to boundary 502, as shown in number 501 of FIG. 5, between the first and second processing code groups which are processed by the motion detecting and compensating parts 105 and 106, the motion detecting circuit 206 and the motion compensating circuit 204 can reference above-mentioned area 504 shown in FIG. 5. Image codes in area 504 are handed from memory 209 to memory 208 through line 111, and memory 208 becomes able to supply the image codes corresponding to area 504 to both motion detecting circuit 206 and motion compensating circuit 204. Similarly, a part of the image codes in the first processing code group are handed from memory 208 to memory 209 through line 112. Accordingly, motion detecting circuit 207 and motion compensating circuit 205 can reference image codes of the part of the first processing code group which are near the boundary. Similarly, motion detecting and compensating part 106 can use a part of the codes in the third processing code group handed through line 113. Motion detecting and compensating part 107 can use a part of the codes in the second processing code group handed through line 114.

Therefore, the encoding device described by FIG. 6 and FIG. 7 solves the problem of limiting motion vectors and prevents the generation of inferior images around the boundaries among the processing code groups. This device, as the second embodiment, also improves slowing the speed of processing for encoding the same as the device described in FIG. 2.

Figure 8:
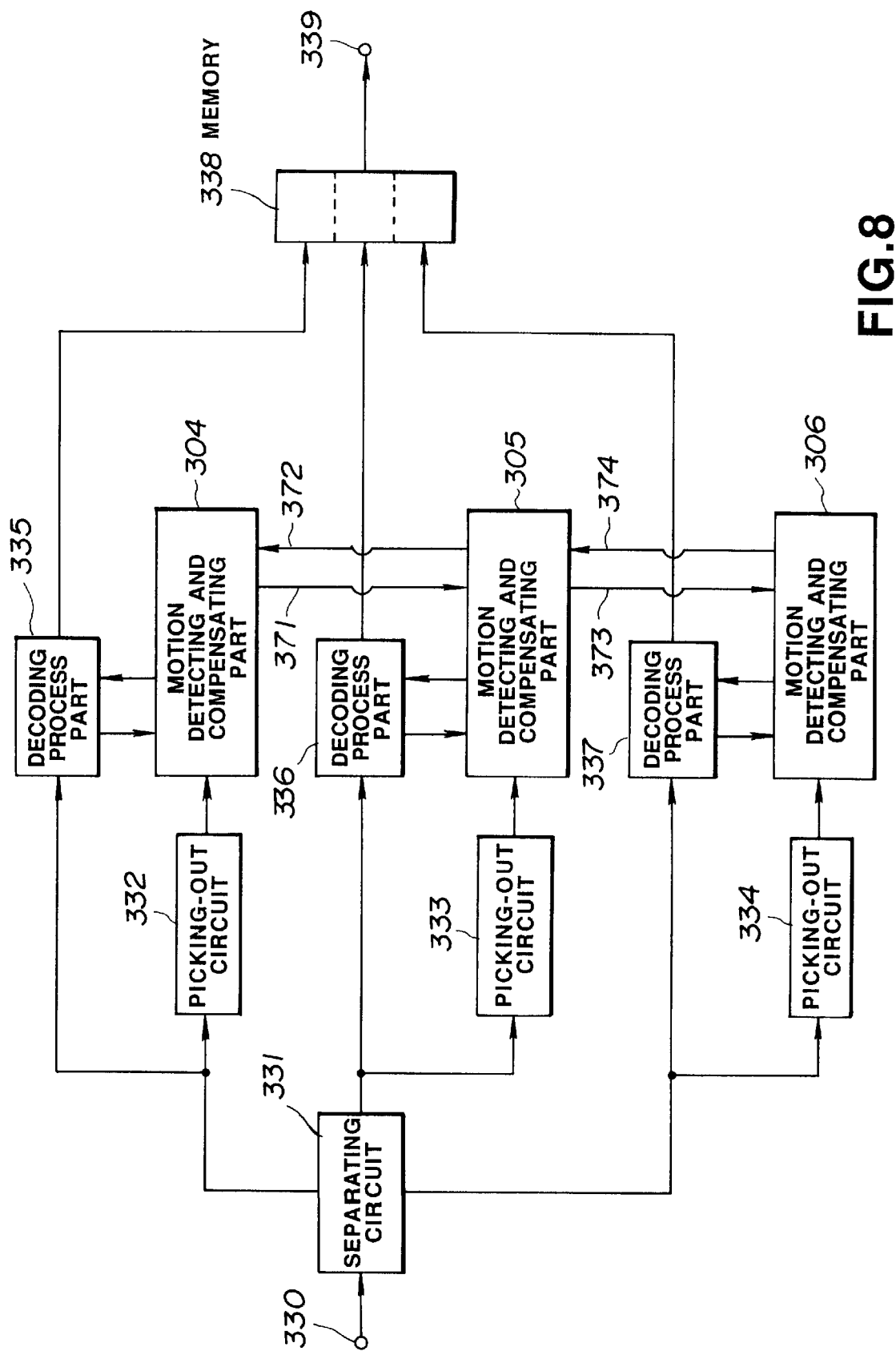
FIG. 8 schematically shows a decoding device corresponding to the encoding device shown in FIG. 6.

FIG. 8 schematically shows a decoding device corresponding to the encoding device shown in FIG. 6. In the encoded device shown in FIG. 8, the encoded code sequence is transmitted through the transmission path input from terminal 330 and is supplied to a separating circuit 331. Separating circuit 331 distributes codes included in the encoded code sequence among three lines which are connected to decoding process parts 335, 336, and 337 and picking-out circuits 332, 333, and 334.

Decoding process parts 335, 336, and 337 decode the encoded image codes respectively. The picking-out circuits 332, 333, and 334 pick up the vector codes. Motion detecting and compensating parts 304, 305, and 306 receive the vector codes and restore the motion vectors. The parts 304, 305, and 306 compensate decoded image codes from decoding process parts 335, 336, and 337 for motion in accordance with the restored motion vectors. Compensated image codes are then returned to decoding process parts 335, 336, and 337.

Decoded image codes obtained by decoding process parts 335, 336, and 337 are supplied to memory 338. Memory 338 then outputs the decoded image codes in order according to that of the original image data.

Lines 371, 372, 373, and 374 are for handing some codes from motion detecting and compensating parts 304, 305, and 306 to another. Therefore, each of the parts 304, 305, and 306 can refer a part of the image codes of other processing code groups the same as parts 105, 106, and 107 shown in FIG. 6.

Figure 9:
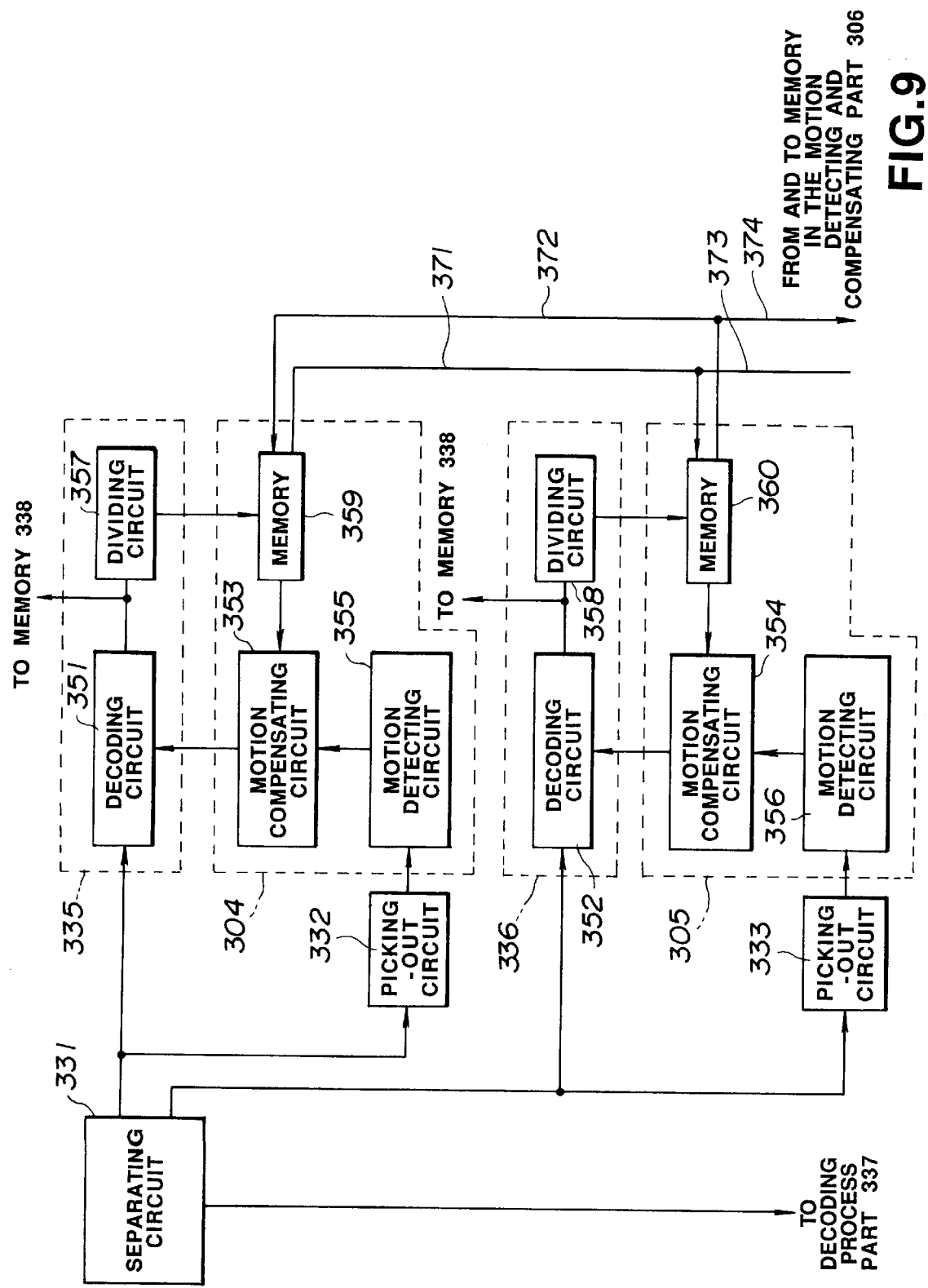
FIG. 9 shows principal parts of the decoding device shown in FIG. 8.

FIG. 9 shows the principal parts of the decoding device shown in FIG. 8. In FIG. 9, the same numbers are used for the same elements in FIG. 8.

The encoded image codes corresponding to the first image processing group are supplied to decoding circuit 351 in the decoding process part 335. Decoding circuit 351 decodes the encoded image codes to restore original image codes by using the restored image codes of the preceding frame provided by motion detecting and compensating part 304.

The restored image codes outputted from decoding circuit 351 are supplied to memory 338 and dividing circuit 357. Dividing circuit 357 divides the restored image codes into code blocks by the same processing means as circuits 115 and 228. Memory 359 is arranged in order to store the restored image codes (decoded image codes) by an amount which is more than one third of the amount of original image codes of one frame.

Motion detecting circuit 355 receives the vector codes from picking-out circuit 332, and restores the motion vectors for the code blocks. The restored motion vectors are supplied to motion compensating circuit 353 which compensates the restored image codes of the preceding frame for motion. Operation of the motion compensating circuit 353 is also the same as motion compensating circuit 16 shown in FIG. 2.

Further, circuits 352, 354, 356, 358, and 360 work the same as circuits 351, 353, 355, 357, and 359 for another processing code group. Lines 371 and 372 are provided for handing the image codes between memories 359 and 360. Lines 373 and 374 are provided for handing the image codes between memory 360 and a memory arranged in part 306.

Accordingly, a portion of the image codes in the first processing code group are handed from memory 359 to memory 360 through line 371. Then, the motion compensating circuit 354 can compensate the image codes as if the motion vectors restored in the motion detecting circuit require image codes included in the first processing code group. Similarly, a part of the image codes in the second processing code group are handed from memory 360 to memory 359 through line 372. Thus, each motion compensating circuit can reference the image codes included in other processing code groups rather than the group which corresponds to the image codes mainly handled in the motion compensating circuit.

Therefore, the decoding device described by using FIG. 8 and FIG. 9 can compensate the restored image codes for motion in accordance with motion vectors that are not limited. Thus, inferior images around the boundaries hardly occur. However, the decoding device can slow the speed of processing relative to the prior decoding device.

Figure 10:
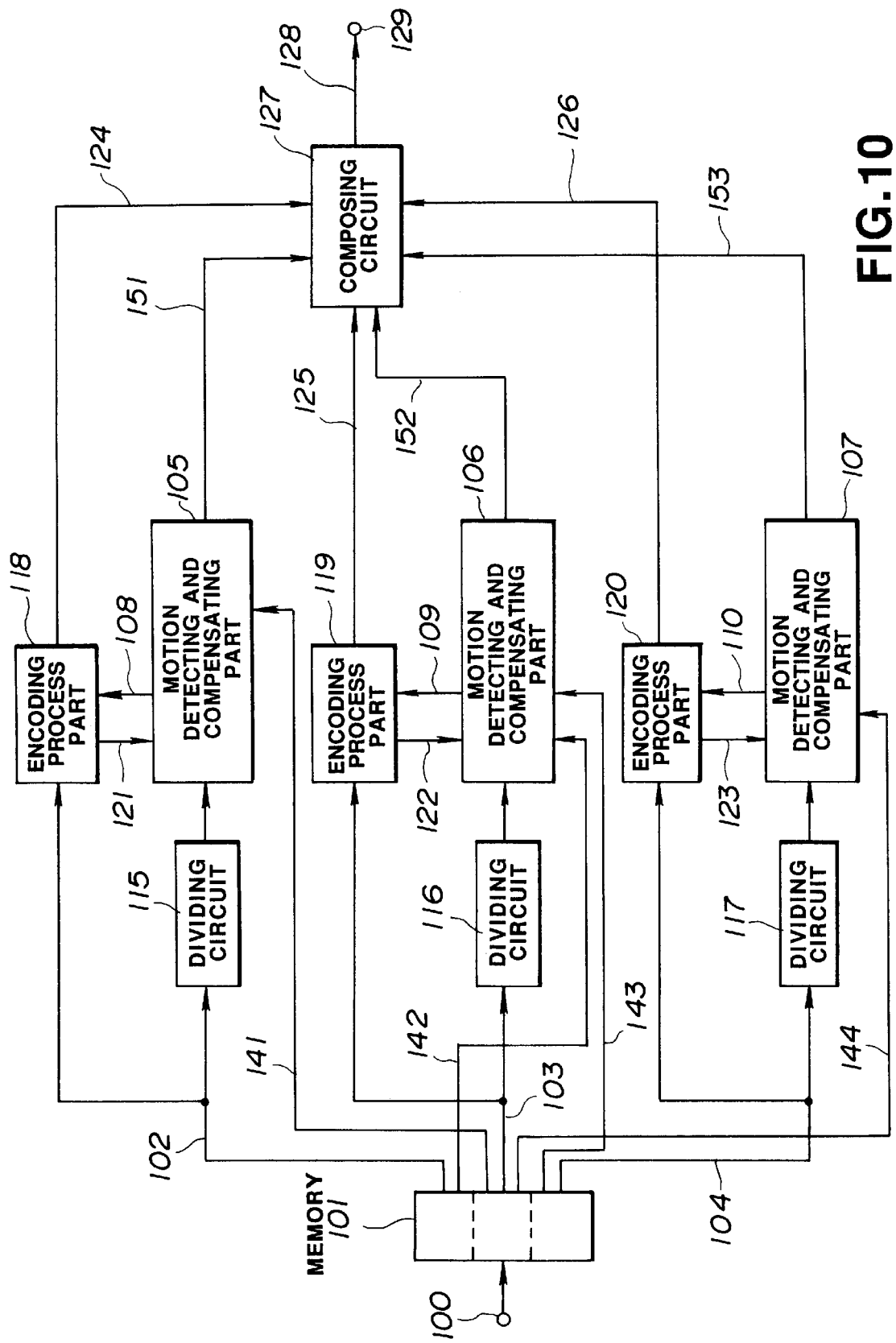
FIG. 10 schematically shows an encoding device as a third embodiment of the invention.
Figure 11:
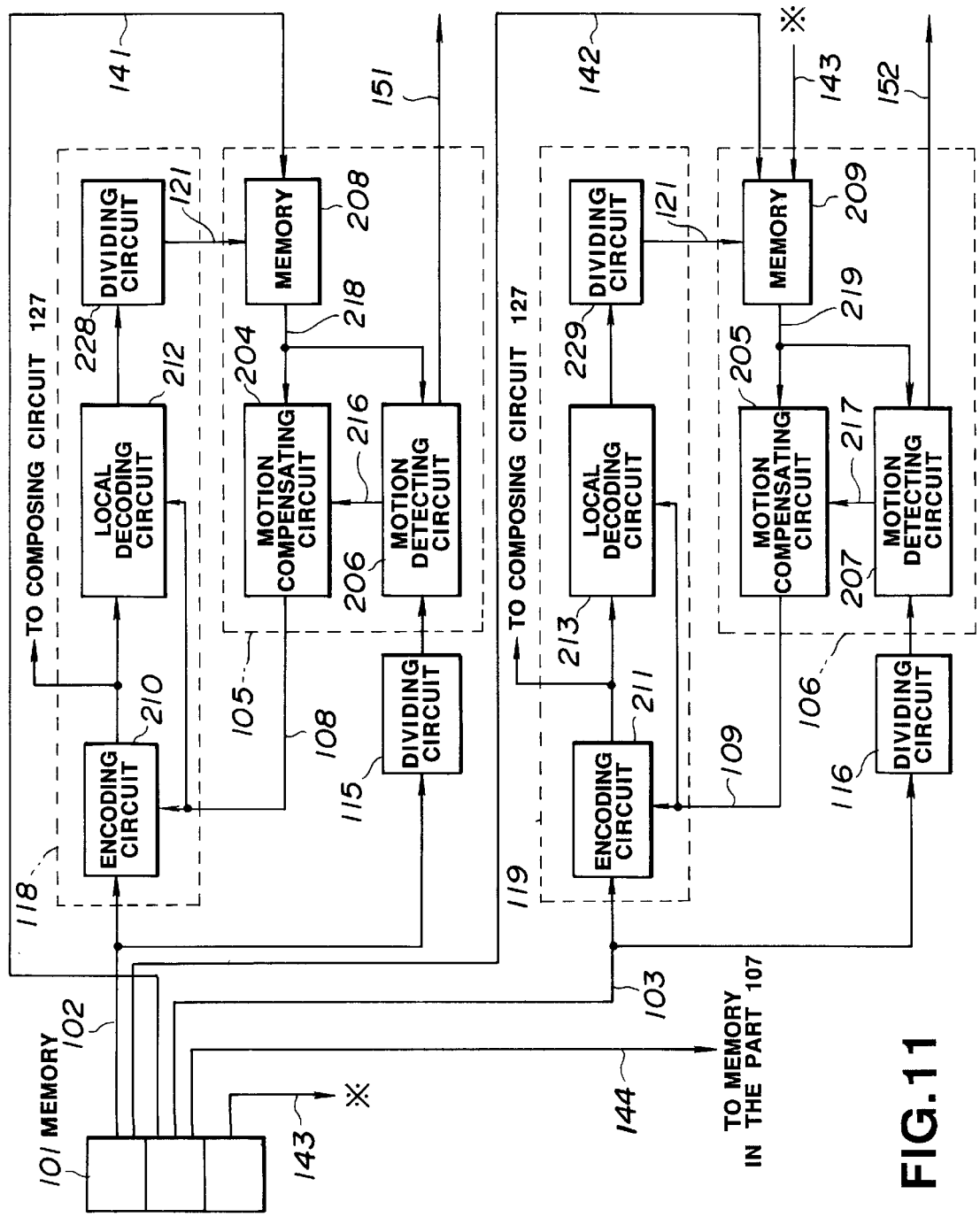
FIG. 11 shows principal parts of the encoding device shown in FIG. 10.

FIG. 10 schematically shows an encoding device as a third embodiment of this invention. FIG. 11 shows the principal parts of the encoding device shown in FIG. 10. In FIGS. 10 and 11, the same numbers are used for similar elements in FIGS. 6 and 7.

As shown in FIG. 10 and FIG. 11, the encoding device has lines 141, 142, 143, and 144 for connecting memory 101 to the memories provided in the motion detecting and compensating parts 105, 106, and 107. Memory 101 is arranged in such a fashion as to be able to supply a part of the image codes corresponding to other processing code groups rather than the group which corresponds to the image codes mainly handled in the memories thereto, via the lines 141, 142, 143, and 144.

Accordingly, each of the parts 105, 106, and 107 can reference a portion of the image codes of other processing code groups. The encoding device shown in FIGS. 10 and 11 also solves the problem to limit motion vectors, and prevents inferior images around the boundaries, the same as the encoding device shown in FIGS. 6 and 7. The encoding device shown in FIGS. 10 and 11 can process the image signal more slowly than the device shown in FIGS. 6 and 7. Thus, the device shown in FIGS. 10 and 11 can process a higher speed signal than the device shown in FIGS. 6 and 7. Each memory in part 105, 106, and 107 needs only a period for writing a part of the image codes included in other processing code groups, but does not need a period for reading the image codes to other memories. However, the device shown in FIGS. 10 and 11 has to have more output terminals in the memory 101.

Figure 12:
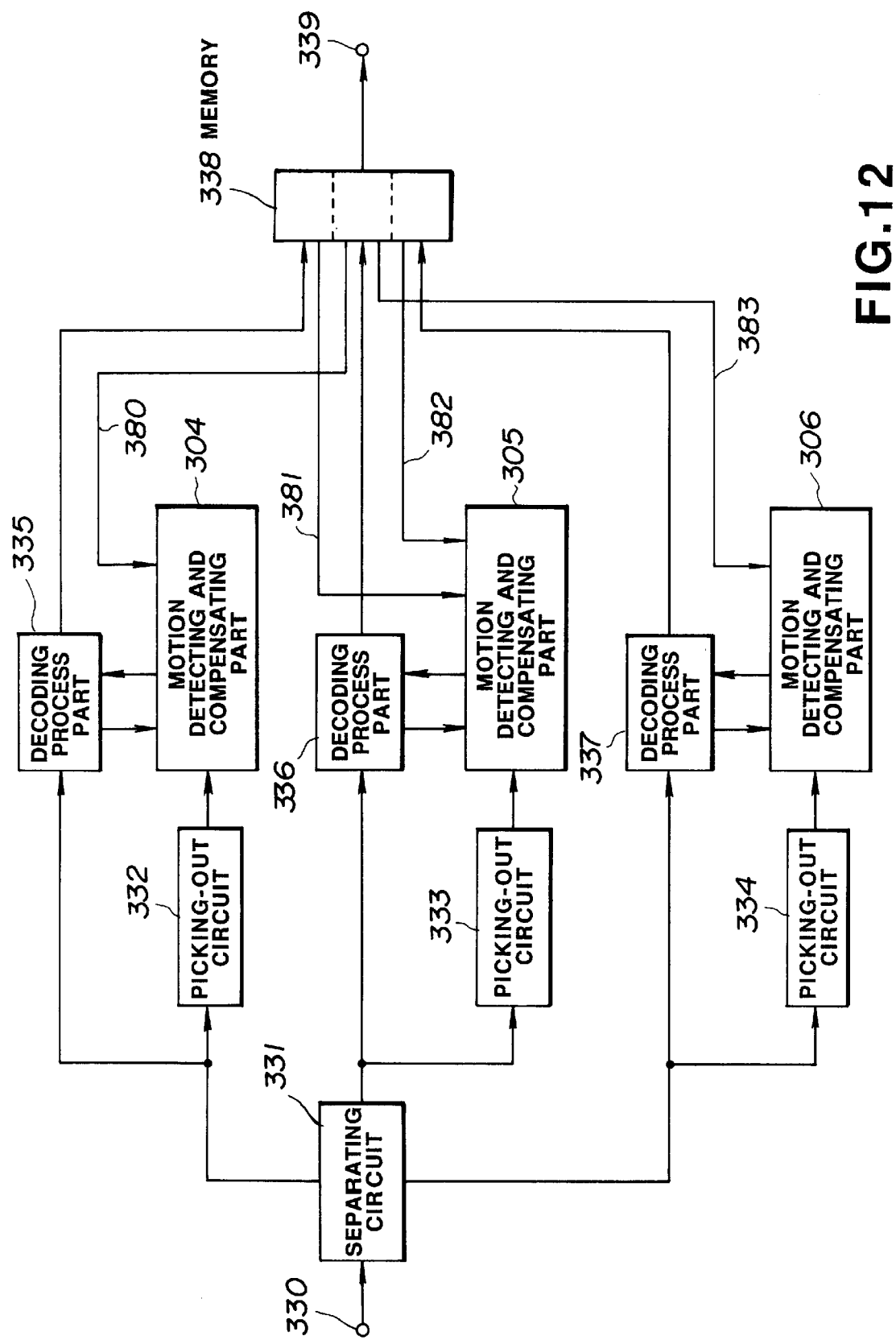
FIG. 12 schematically shows a decoding device corresponding to the encoding device shown in FIG. 10.
Figure 13:
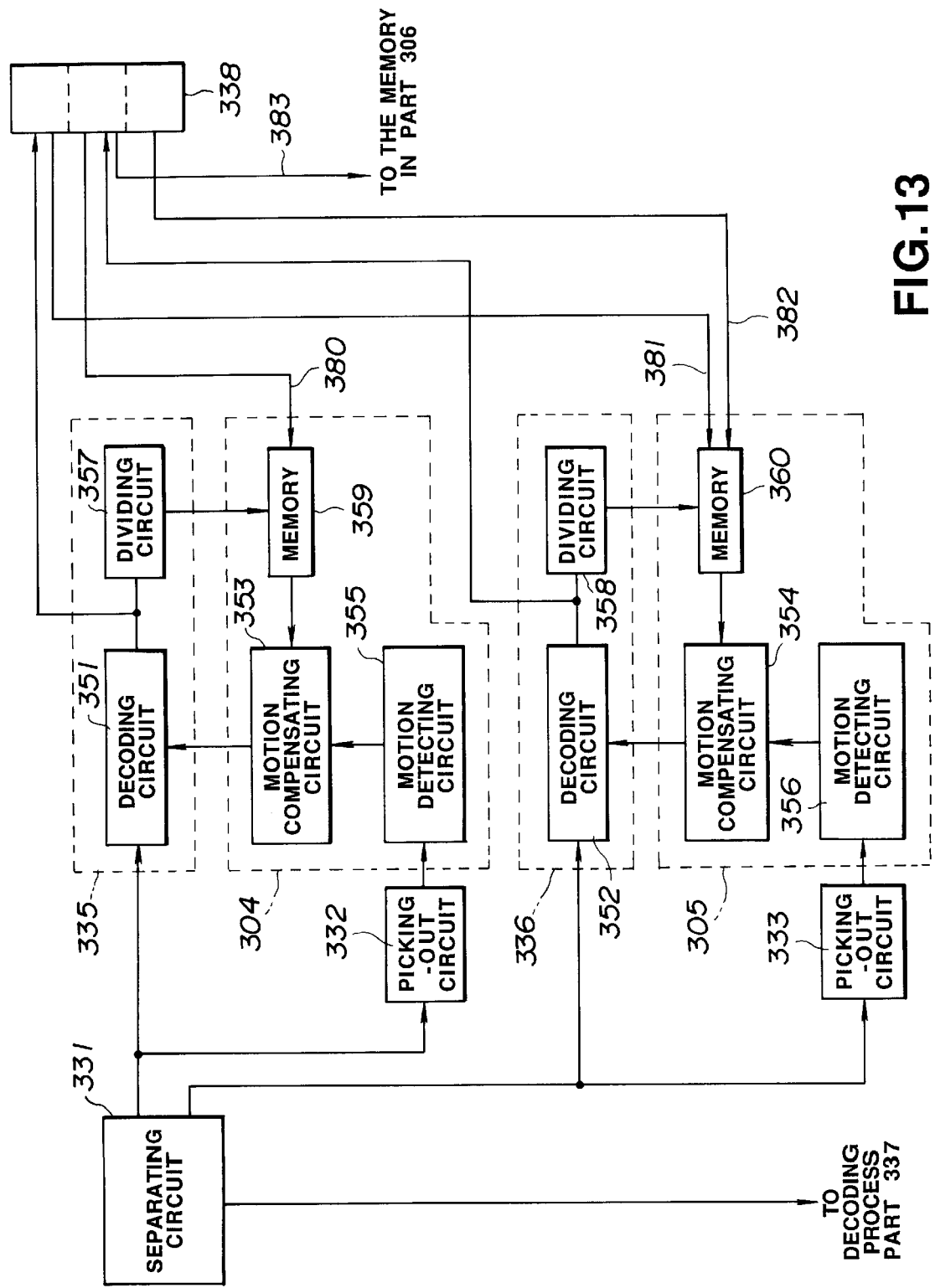
FIG. 13 shows principal parts of the decoding device shown in FIG. 12.

FIG. 12 schematically shows a decoding device corresponding to the encoding device shown in FIG. 10. FIG. 13 shows the principal parts of the decoding device shown in FIG. 12. In FIGS. 12 and 13, the same numbers are used for similar elements in FIG. 8 and 9.

The decoding device shown in FIGS. 12 and 13 differs only in the structure for handing codes between the processing code groups from the decoding device shown in FIGS. 8 and 9.

As shown in FIGS. 12 and 13, the decoding device has lines 380, 381, 382, and 383 for connecting memory 338 to the memories provided in the motion detecting and compensating parts 304, 305, and 306. Memory 338 is arranged to be able to supply a part of the decoded image codes included in the other processing code groups of the preceding frame via lines 380, 381, 382, and 383. Accordingly, each of the parts 304, 305, and 306 can reference a part of the decoded image codes of the other processing code groups. The decoding device shown in FIGS. 12 and 13 also can compensate the restored image codes for motion and can prevent inferior images from occurring the same as the decoding device shown in FIGS. 8 and 9. The decoding device shown in FIGS. 12 and 13 can process a higher speed signal than the decoding device shown in FIGS. 8 and 9.

Figure 14:
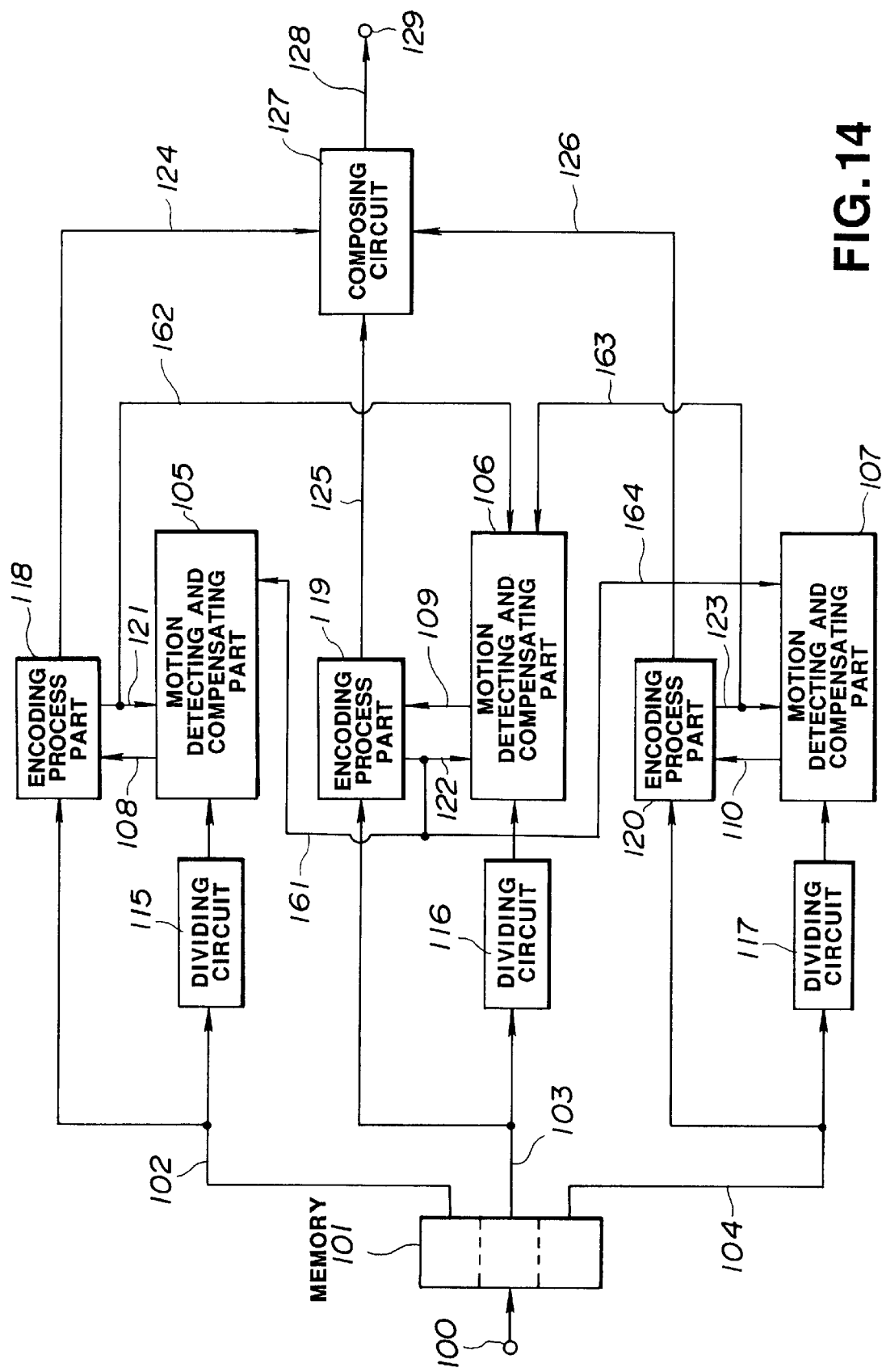
FIG. 14 schematically shows an encoding device as a fourth embodiment of the invention.
Figure 15:
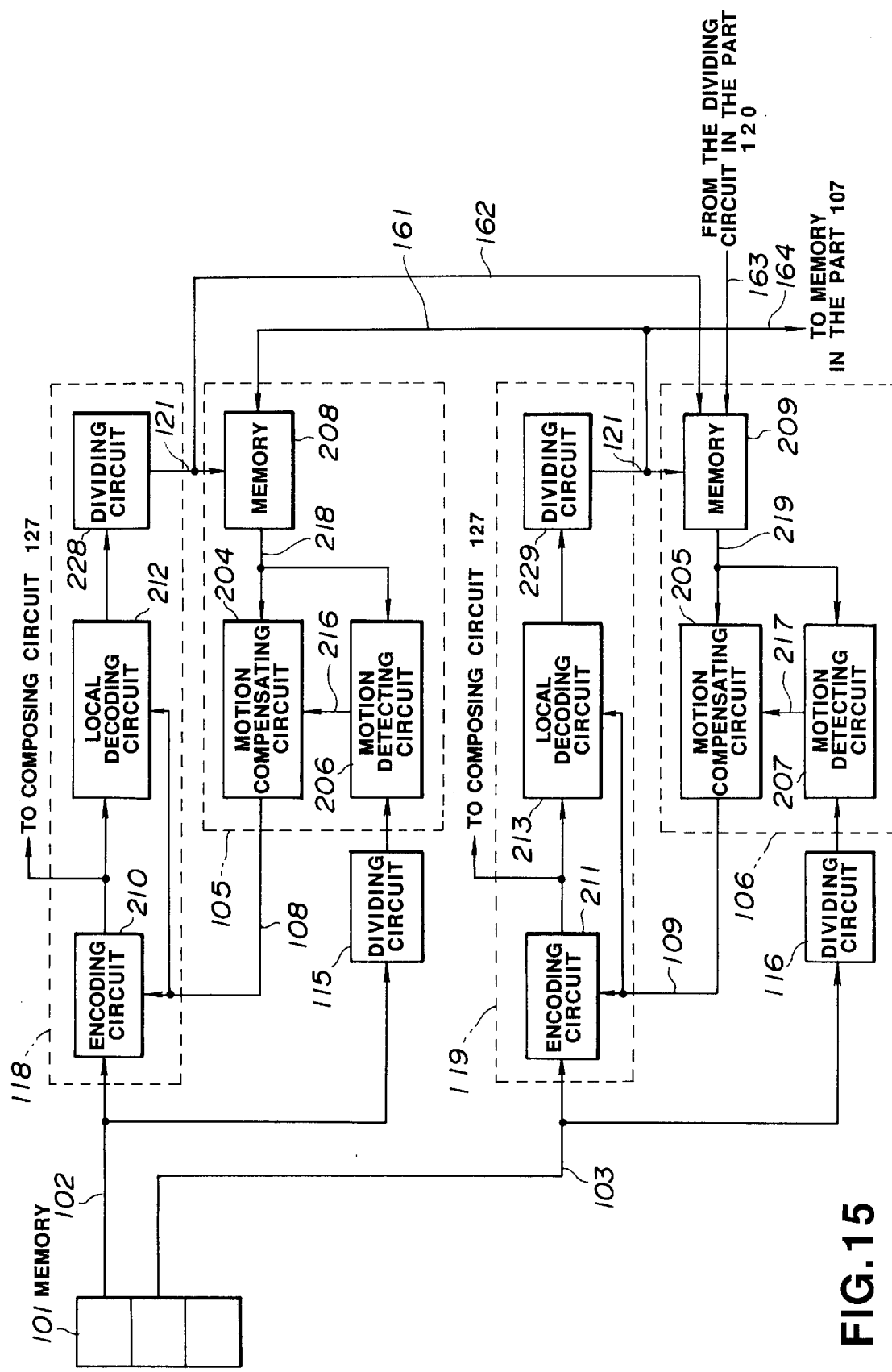
FIG. 15 shows principal parts of the encoding device shown in FIG. 14.

FIG. 14 schematically shows an encoding device as a fourth embodiment of this invention. FIG. 15 shows the principal parts of the encoding device shown in FIG. 14. In FIGS. 14 and 15, the same numbers are also used for similar elements in FIGS. 6, 7, 10, and 11.

The encoding device shown in FIGS. 14 and 15 has lines 161, 162, 163, and 164 which hand the codes to be written in the memories in parts 105, 106, and 107 to other memories. A portion of the image codes in the other processing code groups are also written in the memories via lines 161, 162, 163, and 164.

Therefore, in the encoding device as shown in FIGS. 14 and 15, each of the parts 105, 106, and 107 can reference a portion of the image codes of the other processing code groups. The encoding device shown in FIGS. 14 and 15 also solves the same problem as the device shown in FIGS. 6 and 7 and the device shown in FIGS. 10 and 11.

Figure 16:
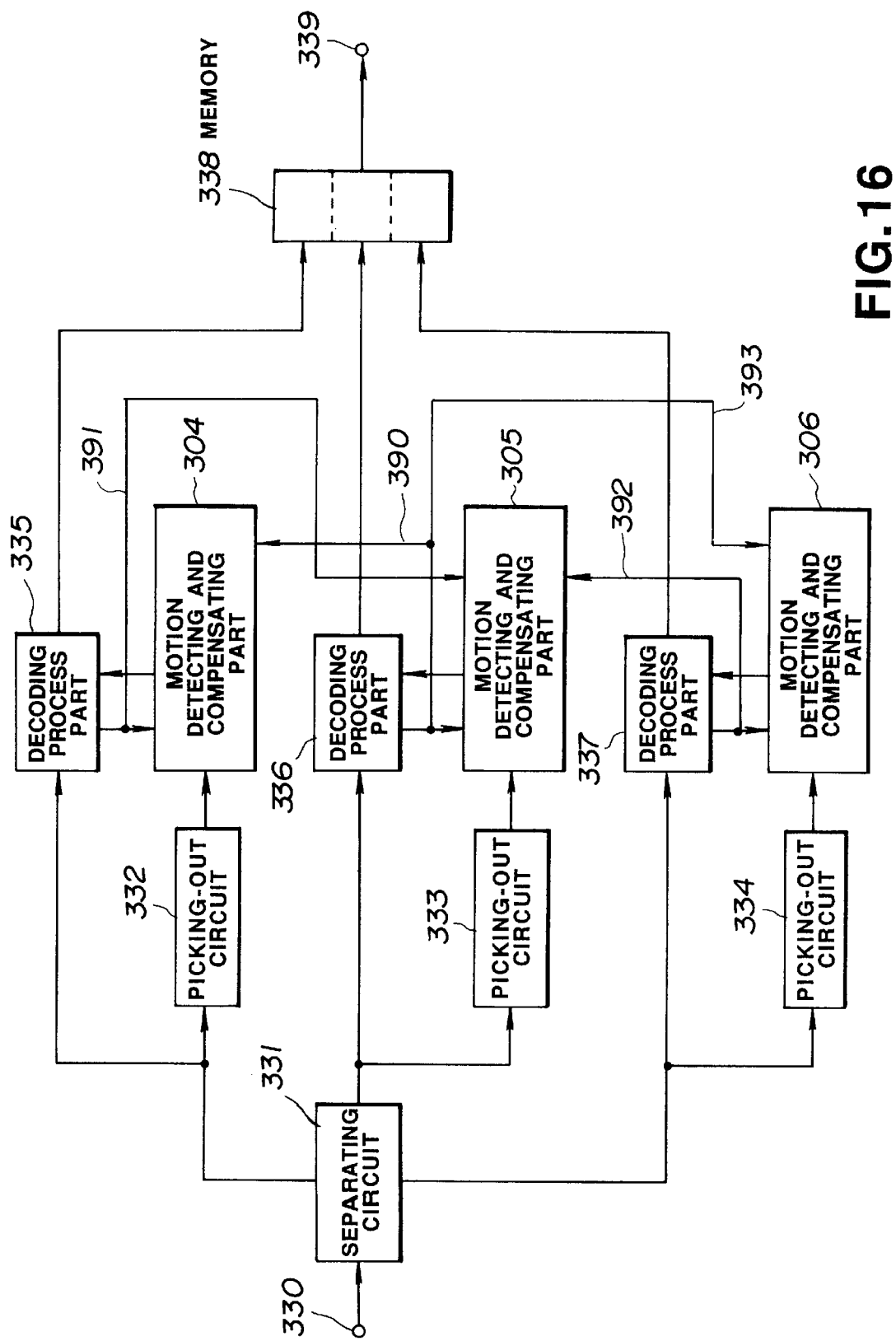
FIG. 16 shows principal parts of a decoding device corresponding to the encoding device shown in FIG. 14.
Figure 17:
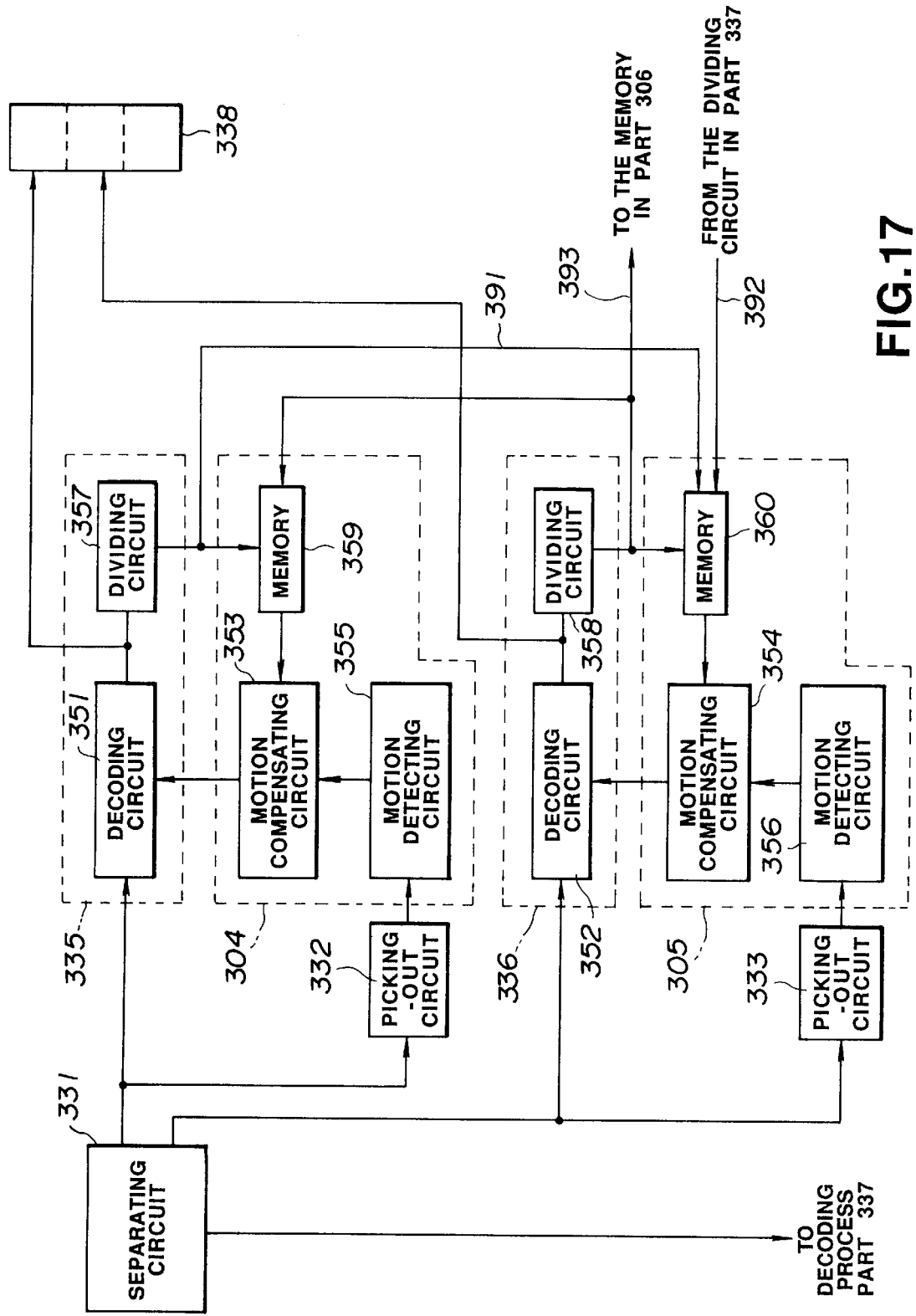
FIG. 17 shows principal parts of the decoding device shown in FIG. 16.

FIG. 16 schematically shows a decoding device corresponding to the encoding device shown in FIG. 14. FIG. 17 shows principal parts of the decoding device shown in FIG. 16. In FIGS. 16 and 17, the same numbers are also used for similar elements in FIGS. 8, 9, 12 and 13.

The decoding device shown in FIGS. 16 and 17 has lines 390, 391, 392, and 393 which hand the codes to be written in the memories in parts 304, 305, and 306 to other memories. A part of the restored image codes in the other processing code groups are also written in the memories via lines 390, 391, 392, and 393.

Therefore, also in the decoding device shown in FIGS. 16 and 17, each of parts 304, 305, and 306 can reference a part of the image signal of other processing code groups. The decoding device shown in FIGS. 16 and 17 also has the same effects as the device shown in FIG. 8 and 9 and the device shown in FIGS. 12 and 13.

As mentioned above, each of the embodiments of this invention slows the processing speed for processing the image signal to be compensated for motion. Each of the embodiments can handle a higher speed signal than the prior device.

What is claimed is:

1. An image processing device, comprising:
    input means for inputting image data of sequential frames of a picture;
    dividing means for dividing the image data of each frame of the picture into a plurality of code groups;
    a plurality of processing means for processing the plurality of code groups respectively, each processing means including a respective motion detection means for dividing a code group into a plurality of encoding blocks and detecting motion of image data of each encoding block of a present frame by comparing each encoding block of the present frame to image data in a seeking area, the seeking area being an area of a previous frame that encompasses a corresponding encoding block of the previous frame; and
    transfer means, connecting processing means for processing adjacent code groups, for transferring image data between processing means for processing adjacent code groups, wherein a given processing means for processing a given code group detects the motion of image data of an encoding block at a boundary between the given code group and an adjacent code group by comparing the image data of the encoding block at the boundary to image data in a corresponding seeking area in a corresponding adjacent code group of the previous frame.

2. A device according to claim 1, wherein each processing means further includes encoding means for encoding image data of its associated code group, in units of the encoding blocks comprising the associated code group by using an output of its associated motion detection means.

3. A device according to claim 2, wherein each encoding means includes calculation means for calculating a difference between image data of the frame to be encoded and image data of the previous frame obtained in accordance with an output of said motion detection means.

4. A device according to claim 3, wherein said motion detection means detects motion vectors which indicate the directions and extent of image movement.

5. A device according to claim 2, wherein said encoding means includes an orthogonal transforming means for orthogonal transforming image data of each of the encoding blocks.

6. A device according to claim 1, wherein said input means inputs encoded image data encoded for compressing an amount of data thereof as the image data, and said plurality of processing means further includes decoding means for decoding one of the plurality of code groups by using an output of said motion detection means.

7. A device according to claim 6, wherein said decoding circuit includes an addition circuit for adding codes of a previous frame to differential codes which indicate a difference between codes of a present frame and the codes of the previous frame and a motion compensation circuit for supplying correlative codes of the previous frame to the differential codes to the adding circuit by varying a timing to be supplied in accordance with the output of the motion detection circuit.

8. A device according to claim 6, wherein said input means further inputs motion vector data which indicate the directions and extents of motions of image data of encoding blocks and wherein said motion detection means detects the motion vector data input by said input means.

9. A device according to claim 1, wherein said motion detection means detects motion vectors which indicate the directions and extents of image movement.

10. A device according to claim 9, wherein each of said plurality of processing means further includes encoding means for encoding one of the plurality of code groups to compress an amount of data thereof by using the motion vectors.

11. A device according to claim 9, wherein each of said plurality of processing means further includes decoding means for decoding one of the plurality of code groups to expand an amount of data thereof by using the motion vectors.

12. An image processing device, comprising:
input means for inputting encoded image data of a picture, the encoded image data being encoded to compensate for motion, and motion data used to obtain the encoded image data, the picture being divided into a plurality of code groups and there being a plurality of units of encoded image data each corresponding to a respective code group;
dividing means for dividing each unit of encoded image data of the picture into a plurality of decoding blocks;
a plurality of decoding means for decoding the plurality of decoding blocks, respectively, by using the motion data, each of said decoding means decoding the decoding blocks of one unit of the encoded image data; and
transfer means, connecting decoding means for decoding adjacent units of encoded image data, for transferring image data between decoding means for decoding adjacent units of encoded image data, permitting a given decoding means to decode the encoded image data of a decoding block in accordance with the motion data.

13. An image processing method comprising the steps of:
inputting image data of sequential frames of a picture;
dividing the input image data of each frame of the picture into a plurality of code groups;
processing the plurality of code groups respectively, with a plurality of processing means;
dividing each code group into a plurality of encoding blocks and detecting motion of image data of each encoding block of a present frame by comparing each encoding block of the present frame to image data in a seeking area, the seeking area being an area of a previous frame that encompasses a corresponding encoding block of the previous frame; and
transferring image data between processing means for processing adjacent code groups, using transfer means connecting processing means for processing adjacent code groups, wherein a given processing means for processing a given code group detects the motion of image data of an encoding block at a boundary between the given code group and an adjacent code group by comparing the image data of the encoding block at the boundary to image data in a corresponding seeking area in a corresponding adjacent code group of the previous frame.

14. An image processing method comprising the steps of:
inputting encoded image data of a picture, the encoded image data being encoded to compensate for motion, and motion data used to obtain the encoded image data, the picture being divided into a plurality of code groups and there being a plurality of units of encoded image data each corresponding to a respective code group;
dividing each unit of encoded image data of the picture into a plurality of decoding blocks;
decoding the plurality of decoding blocks, respectively, by using the motion data, with a plurality of decoding means, each of the decoding means decoding the decoding blocks of one unit of the encoded image data; and
transferring image data between decoding means for decoding adjacent units of encoded image data, using transfer means connecting decoding means for decoding adjacent units of encoded image data, and permitting a given decoding means to decode the encoded image data of a decoding block in accordance with the motion data.

* * * * *

UNITED STATES PATENT AND TRADEMARK OFFICE
CERTIFICATE OF CORRECTION

PATENT NO. : 5,774,592
DATED : June 30, 1998
INVENTOR(S) : YOSHITAKA TAKEUCHI, ET AL.

It is certified that error appears in the above-identified patent and that said Letters Patent is hereby corrected as shown below:

COLUMN 1

Line 55, "Next," should read --Next, a proper position of block 406--; "position of block"" should read --block"--; and "(a" should be deleted.

Line 56, ""proper block" 406)" should be deleted.

COLUMN 8

Line 22, "part" should read --parts--.

COLUMN 11

Line 14, "as" should read --so as--.

Signed and Sealed this

Sixteenth Day of March, 1999

Attest:

Q. TODD DICKINSON

*Attesting Officer*　　　*Acting Commissioner of Patents and Trademarks*